Figure 1:
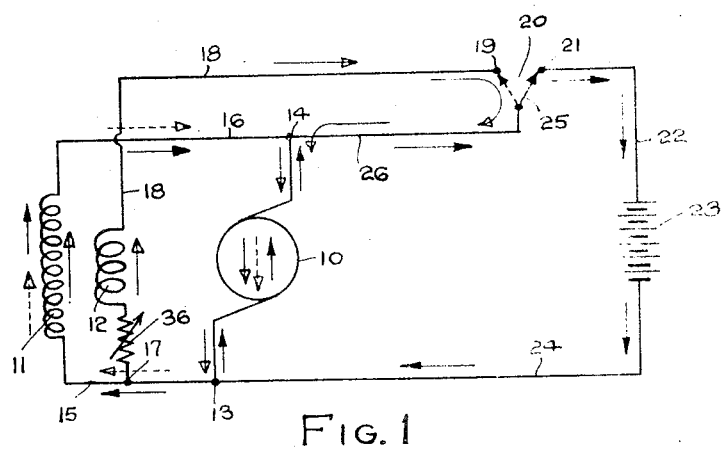

May 16, 1950   H. Y. MAGEOCH   2,507,918
DYNAMIC BRAKE FOR ELECTRIC MOTORS
Filed April 26, 1947

INVENTOR:-
HARRY YALE MAGEOCH
By Leo Edelson
Attorney

Patented May 16, 1950

2,507,918

UNITED STATES PATENT OFFICE 2,507,918

DYNAMIC BRAKE FOR ELECTRIC MOTORS

Harry Yale Mageoch, Havertown, Pa., assignor to Electric Service Manufacturing Co., Philadelphia, Pa., a corporation of Pennsylvania Application April 26, 1947, Serial No. 744,177

5 Claims. (Cl. 318—275)

This invention relates generally to the control and operation of electric motors and more particularly to an improved arrangement for rapidly braking the operation of an electric motor by the application of the principle of dynamic braking.

Heretofore and prior to the present invention, various expedients have been employed for effecting rapid braking of an electric motor, as by "plugging," wherein current is applied to the motor in such manner and by such means as to tend to reverse the direction of rotation of the motor, by "regeneration," wherein the motor is operated as a generator to supply current to an imposed load which operates to retard rotation of the motor, and by mechanical braking, as well as by dynamic braking, wherein the shunt field coil is under continuous energization. All of these prior arrangements require the use of supplementary relays, more or less complicated switch mechanisms and other such relatively expensive devices, which not only increase the initial cost of the motor control arrangement, but also involve added expense for proper maintenance thereof.

Also, in the case of dynamic braking of electric motors as conventionally practiced, the braking is accomplished only by continuous energization of the field coil which involves maintenance of the field flux by current supplied from a battery or other external source of current supply. While the difficulty of continuously energizing the motor field coil has been largely overcome by the use of dynamic braking relays or delayed operation relays, which operate to disconnect the motor field coils from the external source of current supply while maintaining current on the coils until effective dynamic braking has been accomplished, the use of such relays has been relatively expensive. Moreover, because conventional dynamic braking is necessarily dependent upon the use of an external source of current supply for maintenance of the motor field flux, interruption of said source of current supply for any reason whatsoever renders impossible any dynamic braking of the motor.

According to the principles of the present invention, dynamic braking is accomplished by means of an arrangement which insures maintenance of the necessary motor field flux by current supplied thereto from the motor armature while and so long as the latter continues in motion, as when it coasts by virtue of its own momentum or by the momentum of a moving load operatively associated therewith. Thus, it may be said that dynamic braking as accomplished by the present invention involves self-energization of the motor field by the use of an auxiliary field coil which is placed on the field core or otherwise so disposed as to continuously maintain the field flux effective for dynamic braking, by energy derived from the armature itself rotating independently of any current supplied thereto from an external source of supply.

In essence, the dynamic braking arrangement of the present invention involves the use of two field coils preferably wound upon the same pole piece of the motor field, one of these coils being of relatively low resistance as compared to the other and the two coils being relatively so associated in the motor operating circuit for supply of current thereto from the motor armature as to provide for the flow of relatively high current through the low resistance coil while greatly reducing the current flow through the other coil, thereby imposing a heavy load upon the armature of the motor sufficient to rapidly retard its rotation, such imposed load operating continuously to exert a retarding force upon the motor armature so long as it tends to rotate.

From the foregoing, it will be understood that it is among the principal objects of the present invention to provide an exceedingly simple and effective arrangement for effecting dynamic braking of an electric motor wherein the use of delayed operation relays and other such relatively expensive devices ordinarily employed in conjunction with conventional dynamic braking arrangements are dispensed with and wherein the desired dynamic braking is accomplished without the use of an external source of current supply for energization of the field coil or coils.

Other objects and advantages of the present invention will appear more fully hereinafter, it being understood that the present invention consists substantially in the combination, construction, location and relative arrangement of parts, all as described in detail hereinafter, as shown in the accompanying drawings and as finally pointed out in the appended claims.

In the accompanying drawings, which are illustrative of the present invention—

Figure 2:
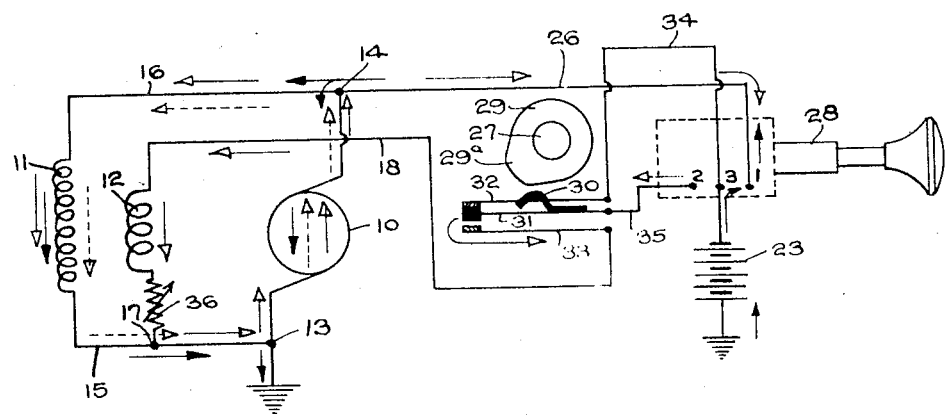

Figure 1 is a schematic diagram illustrating the principles of the present invention as applied to a direct current shunt wound motor; and Figure 2 is a schematic diagram illustrating the application of the present invention to a moving mechanism which is desired to be brought to rest at a given point in its operation.

Referring now to the drawing and more particularly to Figure 1 thereof, it will be observed that for purposes of illustrating the principles of the present invention, a shunt wound direct current motor has been shown which includes as its basic components an armature 10, a shunt field coil 11 and an auxiliary field coil 12 which is preferably wound with the shunt field coil 11 upon the same core or pole piece of the motor stator. The auxiliary field coil 12, which may well be termed the dynamic braking coil, is of a considerably lesser number of turns than the field coil 11 and its wire is of such diameter and conductivity as to very materially reduce its resistance in comparison with that of the field coil 11.

The main field coil 11 is connected in shunt across the terminals 13 and 14 of the armature 10 by the conductors 15 and 16. The low resistance auxiliary or dynamic braking coil 12 is connected at one end thereof, as at 17, to the terminal 13 of the armature, while its opposite end is connected by conductor 18 to one terminal 19 of a single pole, double throw switch 20. The remaining terminal 21 of this switch is connected by conductor 22 to one side of a battery 23 or other source of current supply, the opposite side of the latter being connected by conductor 24 to the armature terminal 13. The double throw pole 25 of the switch 20 is connected to the armature terminal 14 by a conductor 26.

It will be observed that with the switch 20 set as indicated by the full line position thereof shown in Figure 1, current from the source of supply (e. g. the battery 23) will flow through the closed circuit as indicated by the solid-head arrows, this current flowing in parallel through the armature 10 and its field coil 11. This represents a normal operating condition for the motor under which it delivers power for operation of any suitable mechanism (not shown), it being noted that during this normal operation of the motor no current flows through the dynamic braking coil 12 due to the fact that the circuit therethrough is open at the terminal 19 of the switch 20.

If now the switch element 25 is thrown into its dotted line position for contact with the terminal 19, the source of current supply is disconnected from the circuit with the immediate result that current from such source ceases to flow to the armature and its field coil 11. However, continued rotation of the armature generates an electromotive force which induces a current flow through the armature 10 and both of the coils 11 and 12 in the direction indicated by the open-head arrows, the flow of this current being through the coils in parallel so that the current flowing through the auxiliary dynamic braking coil 12 assists that flowing through the field coil 11 to maintain the field flux initially established by the current originally supplied to the field coil by the source of current supply 23. In this connection, it will be noted that upon opening the switch at its terminal 21, and prior to closing it at its terminal 19, the armature 10, upon continued rotation thereof, will operate as a generator to induce a current flow through the field coil 11 in the direction indicated by the dotted line arrows, thereby establishing the original field flux which is subsequently maintained by the current which flows through the auxiliary coil 12 upon closing of the switch at terminal 19 thereof.

So long as the mechanical energy stored in the rotating armature and in any moving load operatively associated with the armature is of sufficient amount to maintain the armature in motion, current will flow through the coils 11 and 12 to maintain the field flux for as long as the armature continues to rotate. However, inasmuch as the resistance of the coil 12 is extremely low as compared with that of the coil 11, the current flowing through the coil 12 is of such high value as compared with that flowing through the coil 11 that the field flux is generated principally by the current flow through the coil 12. Consequently, with the switch closed at terminal 19, the important operating elements of the motor are its armature 10 and the auxiliary dynamic braking coil 12, which latter, by virtue of the fact that it constitutes a low resistance shunt connection across the terminals of the armature, imposes a heavy load on the armature which operates to rapidly retard its rotation, the retarding force continuing in effect until rotation of the armature ceases completely.

From the foregoing, it will be noted that dynamic braking in accordance with the present invention is effected by holding the shunt field coil 11 operatively across the armature in order to sustain the field flux during the period that the switch 20 shifts from its terminal contact 21 to its terminal contact 19, during which brief interval rotation of the armature 10 generates the back E. M. F. necessary for maintenance of an adequate field flux by current flow through the shunt coil 11. Without so sustaining such adequate field flux during the interval that the switch 20 is open, dynamic braking could not be accomplished for the reason that once the field collapses there would then be insufficient voltage generated by the armature for causing current flow through the auxiliary coil 12 at the instant the switch engages the contact terminal 19.

Dynamic braking as accomplished by the present invention has, of course, an extremely wide field of application, one such application being schematically shown in Figure 2 wherein an arrangement is shown for bringing to rest at a given point a moving member 27 operatively associated with and driven by the motor armature 10. This member 27, which may be any device the operation of which is desired to be accurately controlled, may be the shaft, for example, of a vehicle windshield wiper designed to have a predeterminedly fixed "parking" or rest position. Thus, the circuit arrangement shown in Figure 2, which includes a main operating switch mechanism 28 for the windshield wiper or other such utility, is operative, as will be presently described, to insure return of the windshield wiper to its predetermined parking position when the switch mechanism 28 is shifted into its "off" position to interrupt the supply of operating current to the windshield wiper motor of which the armature 10 forms a component part. In any such arrangement, of course, the shaft 27 of the utility will be connected to the armature shaft through a suitable gear reduction (not shown) so that upon movement of the operating switch into its "off" position, the shaft 27 may be brought to rest at some predetermined time or point during a single revolution thereof.

To this end, in the arrangement illustrated, the utility shaft 27 is provided with a cam element 29 having a high lobe 29ª which is adapted to engage, during each revolution of the shaft 27, a raised element 30 fixed to a spring contact member 31. This latter member is the intermediate element of a spring contact assembly which includes in addition to the member 31 an upper spring contact member 32 and a lower spring contact member 33. The contact members 31, 32 and 33 are assembled and so relatively biased as to normally maintain members 31 and 32 in electrical contact with each other and out of contact with the member 33. Engagement of the members 31 and 33 is periodically effected upon rotation of the cam element 29 into biasing engagement with the contact member 31, such engagement being effected once for each revolution of the cam element.

It will be observed that the switch mechanism 28 includes three terminal contacts numbered 1, 2 and 3, the arrangement of the mechanism being such that it is in "off" position when the terminals 1 and 2 are bridged and in "on" position when the terminals 1 and 3 are bridged. It will be understood, of course, that any suitable means may be employed for so bridging the terminals 1 and 2, or 1 and 3.

The arrangement of Figure 2 is similar to that of Figure 1 in that the armature 10 is provided with a shunt field coil 11 and with an auxiliary dynamic braking coil 12, the armature being supplied with current, as in the previous case, from a battery 23 or other suitable source of current supply. The switch mechanism 28 of Figure 2 is comparable to the switch 20 of Figure 1, it being noted in this regard that terminal 3 of the switch mechanism 28 (Figure 2) is connected to one side of the battery 23 and so corresponds to terminal 21 of the switch 20 (Figure 1), while terminal 2 of the switch mechanism 28 corresponds to terminal 19 of the switch 20.

Terminal 3 is connected by conductor 34 to the upper spring contact member 32 of the cam-actuated switch assembly, while terminal 2 is connected by conductor 35 to the intermediate member 31 of said switch assembly. The lower member 33 of the cam-actuated switch is connected to one end of the auxiliary coil 12 by a conductor 18 corresponding to that shown in Figure 1 for connecting the coil 12 to the terminal 19 of the switch 20. Terminal 14 of the armature 10 is connected to terminal 1 of the switch mechanism 28 by a conductor 26 which corresponds to the similarly numbered conductor of Figure 1. Terminal 13 of the armature is connected to the current supply (e. g. battery 23) by way of ground as shown, although such connection may be by way of a conductor, such as 24 shown in Figure 1.

As has been pointed out above, when the switch mechanism 28 is in its "off" position, terminals 1 and 2 only are bridged, thus providing an open circuit between each of these terminals and the current supply terminal 3. Of course, in such position of the switch the motor and consequently the utility operated thereby is at rest. To operate the motor and its associated utility (represented by the cam-equipped shaft 27), the switch mechanism 28 is actuated to bridge the terminals 1 and 3, thereby supplying current from its source of supply to both the motor armature 10 and its shunt field coil 11, the current flow being in the direction indicated by the solid head arrows. So long as the switch remains "on" with terminals 1 and 3 bridged, the motor will continue to run and operate its associated utility 27 with no current flowing through the auxiliary coil 12.

When it is desired to interrupt operation of the utility and bring it to rest at its predetermined "parking" or at rest position, it is merely necessary to shift the switch 28 into its "off" position, in which the terminals 1 and 2 are bridged, the current flow being then only that which is generated by the armature rotating under its own momentum, this current flow being in the direction indicated by the open-head arrows. Tracing this current flow from the armature, it will be observed that such flow can only be to the terminal 14 and thence through two parallel paths, the first of which is the through coil 11 and the second being through the conductor 26, the bridged terminals 1 and 2, conductor 35, spring contact members 31 and 33, conductor 18, coil 12 and thence to the armature terminal 13, this second path being a low resistance shunt across the coil 11 to place a heavy retarding load on the armature.

It will be noted, however, that this latter path of current flow is available only when the sprin contact members 31 and 33 are in electrical engagement with each other, and that such engagement is not effected except by actuation of the cam 29. Until the high lobe 29ª of the cam 29 engages the contact member 31, operating energy from the source of current supply 23 continues to be supplied to the armature and field coil 11 to maintain the motor in operation, thus maintaining rotation of the utility shaft 27 and its associated cam 29. This latter operating condition exists so long as the contact member 31 remains in contact with the upper contact member 32 (as shown in Figure 2).

When, however, the high lobe of the cam 29 shifts the contact member 31 out of engagement with the contact member 32 toward the contact member 33, during the period preceding actual engagement of the members 31 and 33, the only flow of current is from the rotating armature operating as a generator to and through the field coil 11, thereby maintaining the field flux intact until the instant that contact is established between the members 31 and 33 by actuation of the cam 29. At the instant such contact is established, a high current flows through the low resistance auxiliary coil 12, augmenting and maintaining the field flux established by the field coil 11, simultaneously as it imposes a heavy load on the armature tending to bring it to rest, with the cam 29 in operative engagement with the element 30 of spring contact member 31. In this latter position of the cam 29, the utility will be in 'ts "parked" or at rest position.

In some cases, the energy stored in the mechanical system may be so great that it may be desirable to include a resistor in series with the auxiliary field coil 12 alone in order to limit the current flow from the armature through said auxiliary coil during the dynamic braking cycle. This resistor, which may thus serve to protect the coil 12 against burn out, also may well serve to control the degree of braking by varying the ohmic value of such resistor. Such optional variable resistor is designated in the diagrams by the reference numeral 36.

It will be understood, of course, that the present invention is susceptible of various changes and modifications which may be made from time to time without departing from the general principles or real spirit thereof, and it is accordingly intended to claim the same broadly, as well as specifically, as indicated by the appended claims.

What is claimed as new and useful is:

1. A dynamic braking system for an electric motor having an armature and a field coil adapted to be connected to a source of electrical energy, means for disconnecting said armature and field coil from said source of electrical energy whereby said field coil derives energy from the armature rotating as a generator, said field coil thereby substantially maintaining the field flux originally established by said source of electrical energy, and an auxiliary coil adapted for parallel connection with said field coil to assist the latter in developing and maintaining the field flux upon rotation of the armature as a generator, said auxiliary coil being of such low resistance relatively to said field coil as to impose a heavy retarding load on the armature, said auxiliary coil being connected in circuit with said armature only when the armature and field coil are disconnected from their source of electrical energy and the armature is operating as a generator capable of energizing said field and auxiliary coils, and switch means operative to disconnect said armature and field coil from said source of electrical energy and to connect said auxiliary coil in shunt relation to said armature and said field coil, said switch means including a shiftable switch member connected to one terminal of said armature and a pair of terminals selectively engageable by said switch member for alternatively connecting said armature terminal to said electrical energy source or to said auxiliary coil.

2. A dynamic braking system for an electric motor having an armature and a field coil adapted to be connected to a source of electrical energy whereby the latter energizes the field coil to establish and maintain a field flux during normal operation of the motor, an auxiliary coil operatively associated with said field coil and adapted to be connected in circuit with said armature upon disconnection of the armature and its field coil from said source of electrical energy, said auxiliary coil being electrically independent of said source of electrical energy and of such low resistance as compared with that of said field coil as to in effect provide a low resistance by-pass for said field coil upon operation of said armature as a generator, and means operative to disconnect said armature and field coil from said source of electrical energy and to connect said auxiliary coil in parallel with said armature and field coil, said auxiliary coil being then operative to maintain the field flux developed upon rotation of the armature as a generator while imposing a heavy retarding load upon the armature sufficient to rapidly retard its rotation.

3. A dynamic braking system for an electric motor having an armature and a field coil adapted to be connected to a source of electrical energy whereby the latter energizes the field coil to establish and maintain a field flux during normal operation of the motor, an auxiliary coil electrically independent of said source of electrical energy operatively associated with said field coil for connection in parallel therewith upon disconnection of the armature and its field coil from said source of electrical energy, said auxiliary coil being of such low resistance as compared with that of said field coil as to in effect provide a low resistance by-pass for said field coil, manually operative switch means operative to disconnect said armature and field coil from said source of electrical energy and to connect said auxiliary coil in circuit with said armature and field coil, said auxiliary coil being then operative to maintain the field flux developed upon rotation of the armature as a generator while imposing a heavy retarding load upon the armature sufficient to rapidly retard its rotation, and cam-actuated means for controlling the instant of imposition of said retarding load upon the armature.

4. A dynamic braking system for an electric motor having an armature and a field coil adapted to be connected to a source of electrical energy whereby the latter energizes the field coil to establish and maintain a field flux during normal operation of the motor, an auxiliary coil electrically independent of said source of electrical energy operatively associated with said field coil for connection in parallel therewith upon disconnection of the armature and its field coil from said source of electrical energy, said auxiliary coil being of such low resistance as compared with that of said field coil as to in effect provide a low resistance by-pass for said field coil, means operative to disconnect said armature and field coil from said source of electrical energy and to connect said auxiliary coil in circuit with said armature and field coil, said auxiliary coil being then operative to maintain the field flux developed upon rotation of the armature as a generator while imposing a heavy retarding load upon the armature sufficient to rapidly retard its rotation, and means operative automatically to impose said retarding load upon the armature for bringing the same to rest within a predeterminedly fixed period of operation.

5. A dynamic braking system for an electric motor having an armature and a field coil adapted to be connected to a source of electrical energy whereby the latter energizes the field coil to establish and maintain a field flux during normal operation of the motor, an auxiliary coil electrically independent of said source of electrical energy operatively associated with said field coil for connection in parallel therewith upon disconnection of the armature and its field coil from said source of electrical energy, said auxiliary coil being of such low resistance as compared with that of said field coil as to in effect provide a low resistance by-pass for said field coil, means operative to disconnect said armature and field coil from said source of electrical energy and to connect said auxiliary coil in circuit with said armature and field coil, said auxiliary coil being then operative to maintain the field flux developed upon rotation of the armature as a generator while imposing a heavy retarding load upon the armature sufficient to rapidly retard its rotation, a utility operatively associated with and adapted to be driven by said motor, and means operative automatically to impose said retarding load upon the motor armature to arrest the operation of said utility at a predetermined point in its cycle of operation.

HARRY YALE MAGEOCH.

REFERENCES CITED

The following references are of record in the file of this patent:

UNITED STATES PATENTS

| Number | Name | Date |
|---|---|---|
| 679,965 | Sachs | June 25, 1901 |
| 1,252,897 | Foster | Jan. 18, 1918 |
| 2,307,204 | Ehrlich | Jan. 5, 1943 |